(12) United States Patent
Kobayashi et al.

(10) Patent No.: US 6,518,350 B1
(45) Date of Patent: Feb. 11, 2003

(54) RUBBER COMPOSITION AND TIRE

(75) Inventors: Naokazu Kobayashi, Tokyo (JP); Hiroshi Akema, Tokyo (JP); Toshihiro Tadaki, Tokyo (JP); Syuji Nishibata, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/628,426

(22) Filed: Jul. 28, 2000

(30) Foreign Application Priority Data

Jul. 30, 1999 (JP) .......................................... 11-216583

(51) Int. Cl.[7] ..................... C08F 236/10; C08K 5/1515; C08K 3/04; C08K 3/34
(52) U.S. Cl. .................. 524/492; 524/495; 524/262; 524/114; 525/332.9
(58) Field of Search ................................ 524/114, 262, 524/366, 492, 495; 525/332.9

(56) References Cited

U.S. PATENT DOCUMENTS

| | | | | |
|---|---|---|---|---|
| 4,814,214 A | * | 3/1989 | Tomita et al. |
| 5,412,024 A | * | 5/1995 | Okada et al. |
| 5,627,237 A | * | 5/1997 | Halasa et al. |
| 5,703,151 A | * | 12/1997 | Yamamoto et al. |
| 5,939,484 A | * | 8/1999 | Araki et al. |
| 6,057,397 A | * | 5/2000 | Takagishi et al. |
| 6,087,424 A | * | 7/2000 | Yamamoto et al. |
| 6,147,178 A | * | 11/2000 | Nakamura et al. |
| 6,180,710 B1 | * | 1/2001 | Hergenrother et al. |
| 6,191,234 B1 | * | 2/2001 | Tadaki et al. |
| 6,211,278 B1 | * | 4/2001 | Vanel |

FOREIGN PATENT DOCUMENTS

| EP | 0890580 | * | 1/1999 |
|---|---|---|---|
| JP | 3-252433 | | 11/1991 |
| JP | 9-3248 | | 1/1997 |
| JP | 9-183868 | | 7/1997 |
| JP | 10-120828 | | 5/1998 |
| JP | 10-273559 | | 10/1998 |
| JP | 11-91310 | | 4/1999 |
| JP | 11-158293 | | 6/1999 |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

The object of the present invention is to provide a rubber composition with excellent workability, which gives vulcanized products with high wet skid resistance, low rolling resistance and high abrasion resistance, and a tire with those excellent properties. The rubber composition comprising a diene-based rubber (a), silica (b) and a compatibilizer (c). Said compatibilizer (c) is at least one selected from among (I) Aminosilane compounds; (II) Epoxy group-containing compounds; and (III)(IV) Compounds which have an amino group or a polymerizable unsaturated bond, together with a hydroxyl group, an epoxy group, an ether bond, a carboxyl group, an ester bond or a polymerizable unsaturated bond in the molecule.

11 Claims, No Drawings

RUBBER COMPOSITION AND TIRE

BACKGROUND OF THE INVENTION

1. Field of the Invention

The present invention relates to a rubber composition with excellent workability that gives vulcanized products with high wet skid resistance, low rolling resistance and excellent abrasion resistance, and to a tire possessing treads produced from the rubber composition.

2. Description of the Prior Art

Recent requirements for lower fuel consumption by automobiles have led to demand for tire rubber materials that provide reduced tire rolling resistance. Tire rolling resistance can be reduced by lowering the low frequency energy loss of vulcanized rubber; tan δ at 60° C. is used as the evaluation index for vulcanized rubber, and starting rubber preferably has a small tan δ at 60° C.

Demands for running stability have made it highly desirable to provide starting rubber with high frictional resistance on wet surfaces (wet grip) and high frictional resistance on dry surfaces (dry grip). In order to increase the frictional resistance of tires on wet surfaces it is sufficient to increase the high frequency energy loss of vulcanized rubber; here, tan δ at 0° C. is used as the evaluation index for vulcanized rubber, and the starting rubber preferably has a large tan δ at 0° C.

However, the low rolling resistance and high frictional resistance on wet surfaces are in an antimonious relationship, and it has been very difficult to achieve both. The use of rubber compositions containing silica as a reinforcer instead of carbon black has been proposed in the past. Examples include rubber compositions comprising styrene-butadiene copolymer, vinylpolybutadiene and mixtures of silica and carbon black (Japanese Laid-open Patent Publication No. 252433 of 1991, No. 183868 of 1997, and the like.).

These methods, however, require the use of large amounts of expensive silane coupling agents in order to achieve an adequate effect, the mixing temperature must be controlled to no higher than 150–160° C., and the workability of the compounded rubber prior to vulcanization is poorer.

SUMMARY OF THE INVENTION

Problems to be Solved by the Invention

It is an object of the present invention to provide a rubber composition with no mixing temperature problem and excellent workability prior to vulcanization, and which gives vulcanized products with high wet resistance and that satisfy both the required low rolling resistance and abrasion resistance.

It is another object of the invention to provide a tire with high wet skid resistance, low rolling resistance and excellent abrasion resistance.

Features of the Invention

According to the invention, the aforementioned objects are achieved by providing a rubber composition and tire with the composition described below.

[1] A rubber composition comprising a diene-based rubber (a), silica (b) at 5–100 parts by weight to 100 parts by weight of said diene-based rubber (a) and a compatibilizer (c) at 0.1–20 parts by weight to 100 parts by weight of said silica (b), characterized in that said compatibilizer (c) is at least one selected from among:

(I) Aminosilane compounds;

(II) Epoxy group-containing compounds;

(III) Compounds with an amino group and a hydroxyl group, an amino group and an epoxy group, an amino group and an ether, bond, an amino group and a carboxyl group, an amino group and an ester bond or an amino group and a polymerizable unsaturated bond in the molecule; and (IV) Compounds with a polymerizable unsaturated bond and a hydroxyl group, a polymerizable unsaturated bond and an epoxy group, a polymerizable unsaturated bond and an ether bond, a polymerizable unsaturated bond and a carboxyl group or a polymerizable unsaturated bond and an ester bond in the molecule.

[2] A rubber composition comprising a diene-based rubber (a), silica (b) at 5–100 parts by weight to 100 parts by weight of said diene-based rubber (a) and a compatibilizer (c) at 0.1–20 parts by weight to 100 parts by weight of said silica (b), wherein said diene-based rubber (a) contains styrene-butadiene copolymer rubber at 30–100 wt % with respect to said diene-based rubber (a), and said styrene-butadiene copolymer rubber has
  (i) a styrene component content of 5–45 wt %;
  (ii) a butadiene 1,2-bond content of 10–80 wt %;
  (iii) a glass transition temperature of −70 to −10° C.; and
  (iv) an amino group content of 0.01–2.0 mmol per 100 g of said copolymer rubber, and said compatibilizer (c) is at least one selected from among:
  (I) Aminosilane compounds;
  (II) Epoxy group-containing compounds;
  (III) Compounds with an amino group and a hydroxyl group, an amino group and an epoxy group, an amino group and an ether bond, an amino group and a carboxyl group, an amino group and an ester bond or an amino group and a polymerizable unsaturated bond in the molecule;
  (IV) Compounds with a polymerizable unsaturated bond and a hydroxyl group, a polymerizable unsaturated bond and an epoxy group, a polymerizable unsaturated bond and an ether bond, a polymerizable unsaturated bond and a carboxyl group or a polymerizable unsaturated bond and an ester bond in the molecule; and
  (V) Ether bond-containing compounds.

[3] A rubber composition according to [2] above, wherein said compatibilizer (c) is at least one selected from among compounds of (I), (II), (III) and (IV) above.

[4] A rubber composition comprising a diene-based rubber (a), silica (b) at 5–100 parts by weight to 100 parts by weight of said diene-based rubber (a) and a compatibilizer (c) at 0.1–20 parts by weight to 100 parts by weight of said silica (b), wherein said diene-based rubber (a) contains styrene-butadiene copolymer rubber at 30–100 wt % with respect to said diene-based rubber (a), and said styrene-butadiene copolymer rubber has
  (i) a styrene component content of 5–45 wt %;
  (ii) a butadiene 1,2-bond content of 10–80 wt %;
  (iii) a glass transition temperature of −70 to −10° C.; and
  (iv) an alkoxysilyl group content of 0.01–5.0 mmol per 100 g of said copolymer rubber, and said compatibilizer (c) is at least one selected from among:
(I) Aminosilane compounds;
(II) Epoxy group-containing compounds;
(III) Compounds with an amino group and a hydroxyl group, an amino group and an epoxy group, an amino group and an ether bond, an amino group and a carboxyl group, an amino group and an ester bond or an amino group and a polymerizable unsaturated bond in the molecule;
(IV) Compounds with a polymerizable unsaturated bond and a hydroxyl group, a polymerizable unsaturated bond and an epoxy group, a polymerizable unsaturated bond and an ether bond, a polymerizable unsaturated bond and a carboxyl group or a polymerizable unsaturated bond and an ester bond in the molecule; and
(V) Ether bond-containing compounds.

[5] A rubber composition according to [4] above, wherein said compatibilizer (c) is at least one selected from among compounds of (I), (II), (III) and (IV) above.

[6] A rubber composition comprising a diene-based rubber (a), silica (b) at 5–100 parts by weight to 100 parts by weight of said diene-based rubber (a) and a compatibilizer (c) at 0.1–20 parts by weight to 100 parts by weight of said silica (b), wherein said diene-based rubber (a) contains styrene-butadiene copolymer rubber at 30–100 wt % with respect to said diene-based rubber (a), and
said styrene-butadiene copolymer rubber has
(i) a styrene component content of 5–45 wt %;
(ii) a butadiene 1,2-bond content of 10–80 wt %;
(iii) a glass transition temperature of –70 to –10° C.; and
(iv) an alkoxysilyl group content of 0.01–5.0 mmol and an amino group content of 0.01–2.0 mmol per 100 g of said copolymer rubber, and
said compatibilizer (c) is at least one selected from among:
(I) Aminosilane compounds;
(II) Epoxy group-containing compounds;
(III) Compounds with an amino group and a hydroxyl group, an amino group and an epoxy group, an amino group and an ether bond, an amino group and a carboxyl group and an amino group and an ester bond or an amino group and a polymerizable unsaturated bond in the molecule;
(IV) Compounds with a polymerizable unsaturated bond and a hydroxyl group, a polymerizable unsaturated bond and an epoxy group, a polymerizable unsaturated bond and an ether bond, a polymerizable unsaturated bond and a carboxyl group or a polymerizable unsaturated bond and an ester bond in the molecule; and
(V) Ether bond-containing compounds.

[7] A rubber composition according to [6] above, wherein said compatibilizer (c) is at least one selected from among compounds of (I), (II), (III) and (IV) above.

[8] A rubber composition according to any one of [1] through [7] above, which contains as a filler carbon black at 2–100 parts by weight to 100 parts by weight of said diene-based rubber (a).

[9] A tire characterized by possessing treads produced from a rubber composition according to [8] above.

[10] A tire characterized by possessing treads produced from a rubber composition according to any one of [1] through [7] above.

Effect of the Invention

The rubber composition of the invention has excellent workability, as well as an excellent balance among abrasion resistance, wet skid properties and low rolling resistance. The features of the rubber composition of the invention can therefore be suitably used in applications for high performance tire and low fuel consumption tire treads and other tire applications, as well as for general purpose vulcanized rubber applications.

The tires possessing treads produced from the rubber composition of the invention have excellent abrasion resistance, wet skid properties and low rolling resistance and can therefore provide automobiles with low fuel consumption and excellent running stability.

DETAILED DESCRIPTION OF THE INVENTION

The invention will now be explained in further detail.

The rubber composition of the invention contains a diene-based rubber (a) which may be, for example, styrene-butadiene copolymer rubber, acrylonitrile-styrene-butadiene copolymer rubber, butadiene rubber, isoprene rubber, butadiene-isoprene copolymer rubber, butadiene-styrene-isoprene copolymer rubber, natural rubber, acrylonitrile-butadiene copolymer rubber, chloroprene rubber or the like. These may be used alone or in combinations of two or more.

The Mooney viscosity (ML1+4, 100° C.) of the diene-based rubber (a) is preferably 30–200, and more preferably. 40–150.

The diene-based rubber (a) is preferably used as an oil extended rubber, and the Mooney viscosity (ML1+4, 100° C.) of the oil extended rubber is preferably 20–110, and more preferably 30–100.

The diene-based rubber (a) in the rubber composition of the invention preferably contains styrene-butadiene copolymer rubber at 30–100 wt %, and especially 50–100 wt %. The 3styrene-butadiene copolymer rubber also preferably satisfies the following conditions (i) to (iii) and any one of the conditions selected from the following conditions (iv-1)–(iv-3).

(i) A styrene component content of 5–45 wt %, and preferably 20–40 wt %.
(ii) A butadiene 1,2-bond content of 10–80 wt %, and preferably 15–75 wt %.
(iii) A glass transition temperature of –70 to –10° C., and preferably –40 to –15° C.
(iv-1) An amino group content of 0.01–2.0 mmol (preferably 0.1–1.5 mmol) per 100 g of the copolymer rubber.
(iv-2) An alkoxysilyl group content of 0.01–5.0 mmol (preferably 0.1–3.0 mmol) per 100 g of the copolymer rubber.
(iv-3) An alkoxysilyl group content of 0.01–5.0 mmol (preferably 0.1–3.0 mmol) and an amino group content of 0.01–2.0 mmol (preferably 0.1–1.5 mmol) per 100 g of the copolymer rubber.

Styrene-butadiene copolymer rubber satisfying these conditions can be manufactured by publicly known processes, and the following processes (a), (b) and (c) may be mentioned, though they are not restrictive.

(a) Alkoxysilyl Group-introduced Copolymer Rubber

This may be produced by copolymerizing styrene and 1,3-butadiene by anionic polymerization using an organic alkali metal compound such as n-butyllithium as the catalyst, and coupling the active alkali metal end of the resulting polymer with an alkoxysilane compound (for example, Japanese Laid-open Patent Publication No. 215701 of 1988).

(b) Amino Group-introduced Copolymer Rubber

This may be produced by copolymerizing styrene with 1,3-butadiene by anionic polymerization using an organic alkali metal compound such as n-butyllithium, in the presence of a primary or secondary amine, and preferably a secondary amine (for example, Japanese Laid-open Patent Publication No. 279515 of 1994).

(c) Alkoxysilane Group- and Amino Group-introduced Copolymer Rubber

Styrene-butadiene copolymer rubber with both alkoxysilyl groups and amino groups may be produced by bringing the process of (b) above to almost 100% conversion and then adding a modifier with alkoxysilyl groups.

Specific examples of the above-mentioned alkoxysilanes that may be used include the alkoxysilanes mentioned in, for example, Japanese Laid-open Patent Publication No. 233216 of 1995, of which there may be mentioned the following ones:

tetraalkoxysilanes such as tetramethoxysilane, tetraethoxysilane, tetrapropoxysilane, tetrabutoxysilane, tetraphenoxysilane and tetratoluyloxysilane;

alkylalkoxysilanes such as methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, ethyltriphenoxysilane, dimethyldimethoxysilane, dimethyldiethoxysilane, dimethyldipropoxysilane, dimethyldibutoxysilane, dimethyldiphenoxysilane, diethyldimethoxysilane, diethyldiethoxysilane, diethyldipropoxysilane, diethyldibutoxysilane and diethyldiphenoxysilane;

alkenylalkoxysilanes such as vinyltrimethoxysilane, vinyltriethoxysilane, vinyltripropoxysilane, vinyltributoxysilane, vinyltriphenoxysilane, allyltrimethoxysilane, octenyltrimethoxysilane, divinyldimethoxysilane and styryltrimethoxysilane;

arylalkoxysilanes such as phenyltrimethoxysilane, phenyltriethoxysilane, phenyltripropoxysilane, phenyltributoxysilane and phenyltriphenoxysilane;

halogenoalkoxysilanes such as trimethoxychlorosilane, triethoxychlorosilane, tripropoxychlorosilane, tributoxychlorosilane, triphenoxychlorosilane, dimethoxydichlorosilane, dipropoxydichlorosilane, diphenoxydichlorosilane, methoxytrichlorosilane, ethoxytrichlorosilane, propoxytrichlorosilane, phenoxytrichlorosilane, trimethoxybromosilane, triethoxybromosilane, tripropoxybromosilane, triphenoxybromosilane, dimethoxydibromosilane, diethoxydibromosilane, diphenoxydibromosilane, methoxytribromosilane, ethoxytribromosilane, propoxytribromosilane, phenoxytribromosilane, trimethoxyiodosilane, triethoxyiodosilane, tripropoxyiodosilane, triphenoxyiodosilane, dimethoxydiiodosilane, diethoxydiiodosilane, dipropoxyiodosilane, methoxytriiodosilane, ethoxytriiodosilane, propoxytriiodosilane and phenoxytriiodosilane;

halogenoalkylalkoxysilanes such as β-chloroethylmethyldimethoxysilane and γ-chloropropylmethyldimethoxysilane; and nitroalkylalkoxysilanes such as β-nitroethylmethyldimethoxysilane and γ-nitropropylmethyldimethoxysilane.

As examples of the above-mentioned secondary amines there may be mentioned aliphatic secondary amines, aromatic secondary amines and cyclic imines, among which aliphatic secondary amines and cyclic imines are preferred.

As examples of aliphatic secondary amines there may be mentioned dimethylamine, methylethylamine, methylpropylamine, methylbutylamine, methylamylamine, amylhexylamine, diethylamine, ethylpropylamine, ethylbutylamine, ethylhexylamine, dipropylamine, diisopropylamine, propylbutylamine, dibutylamine, diamylamine, dihexylamine, diheptylamine, dioctylamine, methylcyclopentylamine, ethylcyclopentylamine, methylcyclohexylamine, dicyclopentylamine and dicyclohexylamine. Preferred among these are dimethylamine, methylethylamine, diethylamine, dipropylamine, diisopropylamine, dibutylamine, diamylamine, dihexylamine, diheptylamine and dioctylamine.

As examples of aromatic secondary amines there may be mentioned diphenylamine, N-methylaniline, N-ethylaniline, dibenzylamine, N-methylbenzylamine and N-ethylphenethylamine.

As examples of cyclic imine compounds there may be mentioned aziridine, acetidin, pyrrolidine, piperidine, 2-methylpiperidine, 3-methylpiperidine, 4-methylpiperidine, 3,5-ddimethylpiperidine, 2-ethylpiperidine, hexamethyleneimine, heptamethyleneimine, dodecamethyleneimine, coniine, morpholine, oxazine, pyrroline, pyrrole and azepine. Preferred among these are pyrrolidine, piperidine, 3-methylpiperidine, 4-methylpiperidine, 3,5-dimethylpiperidine, 2-ethylpiperidine, hexamethyleneimine and heptamethyleneimine.

These secondary amine compounds may be used alone or in combinations of two or more.

The butadiene 1,2-bond content mentioned in (ii) above can be adjusted to the aforementioned ranges by using an ether compound or tertiary amine as a bond adjustor.

As examples of the aforementioned ether compounds or tertiary amines there may be mentioned dimethoxybenzene, tetrahydrofuran, dimethoxyethane, diethyleneglycol dibutylether, diethyleneglycol dimethylether, triethylamine, pyridine, N-methylmorpholine, N,N',N'-tetramethylethylenediamine and dipiperidinoethane.

The glass transition temperature mentioned in (iii) above can be adjusted by the styrene content and the 1,2-bond (vinyl) content in the microstructure of the butadiene portion. The relationship is such that increasing the styrene content and the 1,2-bond (vinyl) content in the microstructure of the butadiene portion produces a higher glass transition temperature.

This relationship can be used to adjust the glass transition temperature to the above-mentioned range by, for example, a method in which the charging amount of the styrene during polymerization is controlled to adjust the styrene content, a method in which the amount of polar compound added, such as the ether compound or tertiary amine, is controlled during polymerization to adjust the 1,2-bond (vinyl) content (increasing the amount of polar compound added increases the 1,2-bond (vinyl) content), or a combination of these methods. A polar compound or potassium dodecylbenzenesulfonate, potassium linoleate, potassium benzoate, potassium phthalate or potassium tetradecylbenzenesulfonate can also serve as styrene randomizers.

The rubber composition of the invention also contains silica (b) as a filler which is not particularly restricted and may be any precipitated silica, dried silica or synthetic silicate-based silica. A higher reinforcing effect is provided by silica with a small particle size, and small particulate/high aggregate types (high surface area, high oil absorption) have satisfactory dispersability in rubber and are therefore particularly preferred from the standpoints of physical properties and workability.

The mean particle size of the silica (b) is preferably 5–60 μm and especially 8–40 μm, as the primary particle size.

The content of the silica (b) is 5–100 parts by weight, and more preferably 10–90 parts by weight, to 100 parts by weight of the diene-based rubber (a).

In the rubber composition of the invention, carbon black and the silica (b) are preferably used together as fillers, in which case the carbon black is preferably added at 2–100 parts by weight to 100 parts by weight of the diene-based rubber (a) and the silica (b) added at 5–100 parts by weight to 100 parts by weight of the diene-based rubber (a).

The rubber composition of the invention may also contain as additional fillers, carbon-silica dual phase filler, clay, calcium carbonate, magnesium carbonate and the like, in amounts selected as necessary.

For the diene-based rubber (a) as stated in claim 1, the compatibilizer (c) may be at least one compound selected from among (I) to (IV) below. For the diene-based rubber (a) as stated in any one of claims 2, 4 and 6, the compatibilizer (c) may be at least one compound selected from among (I) to (V) below, and it is more preferably at least one compound selected from among (I) to (IV) below.

As specific examples of the "(I) aminosilane compounds" there may be mentioned hexamethyldisilazane, nonamethyltrisilazane, anilitrimethylsilane, bis(dimethylamino)dimethylsilane, bis(diethylamino)dimethylsilane and triethylaminosilane. Preferred among these are silazane compounds and bis(dimethylamino)dimethylsilane.

As specific examples of the "(II) epoxy group-containing compounds" there may be mentioned butylglycidylether, diglycidylether, propylene oxide, neopentylglycol diglycidylether, epoxy resins, epoxidized soybean oil and epoxidized fatty acid esters.

As specific examples of the "(III) compounds with an amino group and a hydroxyl group, an amino group and an epoxy group, an amino group and an ether bond, an amino group and a carboxyl group, an amino group and an ester bond or an amino group and a polymerizable unsaturated bond in the molecule" there may be mentioned the following:

[1] Compounds with an amino group and a hydroxyl group in the molecule: trimethylbenzylammonium hydroxide, gamma acids, triethanolamine, diethanolamine, triisopropanolamine, diisopropanolamine, aminophenol, trans-1,2-cyclohexanediamine tetraacetate, 3-amino-1-propanol, N-methylethanolamine, N,N-dibutylethanolamine, N-methyldiethanolamine, N,N-dimethylethanolamine, N,N-diethylethanolamine, pyridinemethanol, p-hydroxyphenylacetamide, and the like.

[3] Compounds with an amino group and an epoxy group in the molecule: N,N-diglycidyl-o-toluidine, polyglycidylamine, N,N-diglycidylaniline, N,N-diglycidyl-o-toluidine, tris-epoxypropylisocyanurate, and the like.

[3] Compounds with an amino group and an ether group in the molecule: diaminodiphenylether, morpholine, N-(3-aminopropyl)morpholine, 2-methyl-4-methoxydiphenylamine, p-phenetidine, p-cresidine, 3-isopropoxyaniline, 3-lauryloxypropylamine, and the like.

[4] Compounds with an amino group and a carboxyl group in the molecule: anthranilic acid, sodium phthalaminate, p-aminobenzoic acid, iminodiacetic acid, aminododecanoic acid, aminocarboxylates, carboxybetaine, imidazoliniumbetaine, pyradinemonocarboxylic acid, 2,3-pyrazinedicarboxylic acid, picolinic acid, citrazinic acid, keridamu acid, quinaldic acid, 3-carbamoyl-pyrazinecarboxylic acid, "KENGARD" (trade name of Kenko Tsusho Co.), and the like.

[5] Compounds with an amino group and an ester group in the molecule: ethyl p-aminobenzoate, polyurethane, methyl polyglutamate, and the like.

[6] Compounds with an amino group and a polymerizable unsaturated bond in the molecule: 4,4'-diaminostilbene-2,2'-disulfonic acid, diacetoneacrylamide, N-[3-(dimethylamino)propyl]methacrylamide, N-t-octylacrylamide, diallylamine, 2-vinylpyridine, triacrylformalate, triallyl isocyanurate, 2-acrylamido-2-methylpropanesulfonic acid, dimethylaminoethyl acrylate, dimethylaminoethyl methacrylate, diethylaminoethyl methacrylate, and the like.

As specific examples of the "(IV) compounds with a polymerizable unsaturated bond and a hydroxyl group, a polymerizable unsaturated bond and an epoxy group, a polymerizable unsaturated bond and an ether bond, a polymerizable unsaturated bond and a carboxyl group or a polymerizable unsaturated bond and an ester bond in the molecule" there may be mentioned the following:

[1] Compounds with a polymerizable unsaturated bond and a hydroxyl group in the molecule: allyl alcohol, polyoxyethylenenonyl propenylphenyl ether, polyoxyethyleneallylglycidyl nonylphenyl ether, bisabolol, hydroxypropyl acrylate, 2-hydroxypropyl methacrylate, and the like.

[2] Compounds with a polymerizable unsaturated bond and an epoxy group in the molecule: epoxidized soybean oil, epoxidized coconut oil, epoxidized palm oil, glycidyl methacrylate, and the like.

[3] Compounds with a polymerizable unsaturated bond and an ether bond in the molecule: trimethylolpropane diallylether, diethyleneglycol bisallylcarbonate, tetrahydrofurfuryl methacrylate, and the like.

[4] Compounds with a polymerizable unsaturated bond and a carboxyl group in the molecule: dodecadienic diacid, crotonic acid, itaconic acid, oleic acid, 2-methacryloyloxyethylsuccinic acid, and the like.

[5] Compounds with a polymerizable unsaturated bond and an ester bond in the molecule: cyclohexyl acrylate, allyl acetate, diethyl ethoxymethylenemalonate, diallyl terephthalate, diallyl isophthalate, isobutyl acrylate, tripropyleneglycol acrylate, tetraethyleneglycol acrylate, 2-methoxyethyl acrylate, lauryl acrylate, n-stearyl acrylate, trimethylolpropane triacrylate, 1,4-butanediol diacrylate, 1,6-hexanediol diacrylate, pentaerythritol triacrylate, ethyl methacrylate, n-butyl methacrylate, 2-ethylhexyl methacrylate, lauryl methacrylate, alkyl methacrylate, stearyl methacrylate, cyclohexyl methacrylate, and the like.

As specific examples of the "(V) ether bond-containing compounds" there may be mentioned isopropyl ether and dibutyl ether.

The content of the compatibilizer (c) is preferably 0.1–20 parts by weight and more preferably 0.5–10 parts by weight, to 100 parts by weight of the silica (b) added.

The rubber composition of the invention may also contain vulcanizing agents, vulcanization accelerators, extender oils or other additives if desired.

A typical vulcanizing agent that is used is sulfur, and sulfur-containing compounds, peroxides and the like may also be used. The amount of vulcanizing agent to be used is normally 0.5–10 parts by weight and preferably 1–6 parts by weight, to 100 parts by weight of the diene-based rubber (a).

Vulcanization accelerators include aldehydeammonia-based, guanidine-based, thiourea-based, thiazole-based and dithiocarbaminic acid-based compounds. The amount of vulcanization accelerator to be used is normally 0.5–15 parts by weight and preferably 1–10 parts by weight, to 100 parts by weight of the diene-based rubber (a).

As extender oils there may be mentioned petroleum-based compounded oils such as aromatic process oils, naphthene-based process oils and paraffin-based process oils, with aromatic process oils and naphthene-based process oils being preferred. The amount of extender oil to be used is normally 0–100 parts by weight and preferably 5–50 parts by weight, to 100 parts by weight of the diene-based rubber (a).

Other additives that may be used as desired or as necessary include silane coupling agents, zinc oxide, vulcanizing aids, antioxidants, processing aids and the like.

When preparing the rubber composition of the invention, first the diene-based rubber (a), compatibilizer (c), silica (b), the other fillers (carbon black, carbon-silica dual phase filler, and the like), the extender oil and other additives are blended at a temperature of 70–180° C. using a kneading machine such as a Banbury mixer. Next, the resulting mixture is cooled and then the vulcanizing agent such as sulfur and the vulcanization accelerator, and the like are blended therewith using a Banbury mixer or mixing roll, to prepare a rubber composition. The prepared rubber composition is molded into the desired shape and vulcanized at a temperature of 140–180° C. to produce vulcanized rubber of the desired shape, i.e. the rubber product.

The vulcanized rubber composition of the invention has an excellent balance between abrasion resistance, wet skid properties and low rolling resistance, and therefore is suitable to be used for high performance tire and low fuel consumption tire treads.

Tires possessing treads produced from the rubber composition of the invention exhibit excellent abrasion resistance, wet skid properties and rolling resistance, and automobiles using the tires exhibit low fuel consumption and excellent running stability.

Embodiments of the Invention

The present invention will now be explained in greater detail by way of examples which, however, are in no way intended to restrict the scope of the invention. Throughout, styrene-butadiene copolymer rubber will be referred to as "copolymer rubber".

The compatibilizers used in the examples were the following.

Compatibilizer "a": Dibutylether, product of Wako Junyaku
Compatibilizer "b": Hexamethyldisilazane, product of Shinetsu Chemicals, KK.
Compatibilizer "c": "Epoxidized Soybean Oil SO", trade name of Daihachi Chemical Industries, KK.
Compatibilizer "d": 3-Lauryloxypropylamine, product of Wako Junyaku
Compatibilizer "e": Triethanolamine, product of Wako Junyaku
Compatibilizer "f": 2-Methacryloyloxyethyl succinate, product of Kyoeisha Chemical Co.
Compatibilizer "g": "KENGARD 300-P", trade name of Kenko Tsusho
Compatibilizer "h": "Struktol EF44", trade name of SCHILL AND SEILACHER, mixture of fatty acid salt and fatty acid.

The various measurements for the examples were conducted according to the following methods.

(1) Content of Vinyl in Butadiene Portion (%)
Determined by the infrared absorption spectrum method (Morello method).

(2) Content of Bonded Styrene (%)
Determined by the infrared absorption spectrum method, based on a calibration curve.

(3) Mooney Viscosity (ML1+4, 100° C.)
Measured according to JIS K6300 with an L-rotor, 1 minute preheating, 4 minute rotor operation time, and a temperature of 100° C.

(4) Content of Alkoxysilyl Group (mmol/100 g Rubber)
This was quantified based on a calibration curve prepared for absorption near 1160 $cm^{-1}$ due to Si—C bonds in an infrared absorption spectrum. The measured value was divided by the number average molecular weight(Mn) in terms of polystyrene obtained by the GPC method and the alkoxysilyl group molecular weight to obtain the number of moles of alkoxysilyl groups.

(5) Content of Amino Group (mmol/100 g Rubber)
This was measured and determined according to the following method based on the "Acid-base titration method using perchloric acid-acetic acid solution" described in J. Anal. Chem., Vol.24, p.564 (1952) by Robert T. Keen and James S. Fritz. Chloroform was used as the solvent for dissolution of the sample, Methyl Violet was used as the titration indicator, and the amino group content was quantified based on a calibration curve prepared from a tri-n-octylamine solution of known concentration.

(6) Glass Transition Temperature (°C.)
A differential scanning calorimeter (DSC) by Seiko Denshi Kogyo, KK. was used for measurement at a temperature increase rate of 10° C./min, and the extrapolation initiation temperature was recorded as the glass transition temperature.

(7) Molecular Weight Distribution (Mw/Mn)
Gel permeation chromatography (GPC) was used to determine the distribution in terms of polystyrene.

(8) Property Evaluation of Vulcanized Product
The starting rubber was mixed in a 1.7 liter Banbury mixer kneading machine according to one of the formulations T-Z listed in Table 2, and then vulcanization was carried out for a prescribed time at 145° C. and the vulcanized product was subjected to various measurements.

(a) tan δ (60° C.) and tan δ (0° C.)
A dynamic spectrometer by U.S. Rheometrix was used.
The conditions for measurement of tan δ (60° C.) were 1% tension distortion, a frequency of 10 Hz and a temperature of 60° C. The measurement results are expressed as the measured value, with a smaller value indicating lower (more satisfactory) rolling resistance.

The same instrument was used for measurement of tan δ (0° C.), with 0.1% tension distortion, a frequency of 10 Hz and a temperature of 0° C. The measurement results are expressed as the measured value, with a larger value indicating greater (more satisfactory) wet skid resistance.

(b) Lamborn Abrasion Factor
A Lamborn abrasion test machine was used, the factor was expressed as the degree of abrasion for a 60% slip rate, and the measuring temperature was room temperature. A larger factor indicates more satisfactory abrasion resistance.

(c) Workability
After mixing, the Mooney viscosity (ML1+4, 100° C.) of the compounded rubber was evaluated.

(d) Hardness
This was measured using a JIS hardness meter Type (A), at a temperature of 25° C.

EXAMPLE 1

Synthesis of Copolymer Rubber A, Preparation and Evaluation of Oil Extended Rubber To a 20-liter volume autoclave reactor equipped with a stirrer and jacket and adequately displaced with nitrogen there were continuously supplied styrene at 7.5 g/min, 1,3-butadiene containing 100 ppm of 1,2-butadiene at 22.5 g/min, cyclohexane at 150 g/min, tetrahydrofuran at 5.1 g/min and n-butyllithium at 0.151 mmol/min, while the temperature of the reactor was controlled to 55° C. Silicon tetrachloride was added continuously at 0.03 mmol/min through the top outlet of a first reactor, and this was introduced into a second reactor connected to the first reactor for modification. To the reacted polymerization solution there was added 2,6-di-t-butyl-p-cresol, and then 187.5 g of an extending oil (trade name: FUCCOLE AROMAX #3, product of Fuji Kosan Co.) (37.5 parts by weight to 100 parts by weight of the rubber) was added, the solvent was removed by steam stripping, and the rubber was dried with a hot roll at 115° C. The rubber produced by the polymerization was designated as copolymer rubber A, and the composition and properties of this copolymer rubber A and the oil extended rubber are shown in Table 1.

Using the oil extended rubber prepared above and the high cis-polybutadiene rubber and compatibilizer "a" shown in Table 3, compounded rubber prepared according to formulation Y shown in Table 2 was vulcanized and the properties were evaluated. The results are shown in Table 3.

EXAMPLE 2

Synthesis of Copolymer Rubber B, Preparation and Evaluation of Oil Extended Rubber In a 5-liter volume autoclave reactor displaced with nitrogen there were charged 2500 g of cyclohexane, 38 g of tetrahydrofuran, 100 g of styrene and 385 g of 1,3-butadiene. After adjusting the temperature of the reactor contents to 16° C., 3.45 mmol of n-butyllithium was added and polymerization was initiated. The polymerization was carried out under adiabatic conditions, and the maximum temperature reached 90° C.

After reaching a polymerization conversion rate of 100%, another 15 g of butadiene was added and polymerized, after which 2.76 mmol of methyltriphenoxysilane was added for modification after 15 minutes, followed by addition of 0.89 mmol of silicon tetrachloride. After the reaction 2,6-di-t-butyl-p-cresol was added to the polymer solution, and then 187.5 g of an extending oil (trade name: FUCCOLE AROMAX #3, product of Fuji Kosan Co.) (37.5 parts by weight to 100 parts by weight of the rubber) was added, the solvent was removed by steam stripping, and the rubber was dried with a hot roll at 115° C. to obtain oil extended rubber. The rubber produced by the polymerization was designated as copolymer rubber B, and the composition and the like of this copolymer rubber B and the oil extended rubber are shown in Table 1.

Using the oil extended rubber prepared above and the natural rubber and compatibilizer "b" shown in Table 3, compounded rubber prepared according to formulation Y shown in Table 2 was vulcanized and the properties were evaluated. The results are shown in Table 3.

EXAMPLE 3

Synthesis of Copolymer Rubber C, Preparation and Evaluation of oil Extended Rubber In a 5-liter volume autoclave reactor displaced with nitrogen there were charged 2500 g of cyclohexane, 75 g of tetrahydrofuran, 125 g of styrene and 365 g of 1,3-butadiene. After adjusting the temperature of the reactor contents to 50° C., 3.45 mmol of n-butyllithium was added and polymerization was initiated. The polymerization was carried out under adiabatic conditions, and the maximum temperature reached 80° C.

After reaching a polymerization conversion rate of 100%, another 10 g of butadiene was added and polymerized, after which 0.86 mmol of silicon tetrachloride was added. After the reaction, 2,6-di-t-butyl-p-cresol was added to the polymer solution, and then 187.5 g of an extending oil (trade name: FUCCOLE AROMAX #3, product of Fuji Kosan Co.) (37.5 parts by weight to 100 parts by weight of the rubber) was added, the solvent was removed by steam stripping, and the rubber was dried with a hot roll at 115° C. to obtain oil extended rubber. The rubber produced by the polymerization was designated as copolymer rubber C, and the composition and the like of this copolymer rubber C and the oil extended rubber are shown in Table 1.

Using the oil extended rubber prepared above and the high cis-polybutadiene rubber and compatibilizer "b" shown in Table 3, compounded rubber prepared according to formulation Y shown in Table 2 was vulcanized and the properties were evaluated. The results are shown in Table 3.

EXAMPLE 4

Synthesis of Copolymer Rubber D, Preparation and Evaluation of Oil Extended Rubber In a 5-liter volume autoclave reactor displaced with nitrogen there were charged 2500 g of cyclohexane, 75 g of tetrahydrofuran, 125 g of styrene, 365 g of 1,3-butadiene and 3.45 mmol of piperidine. After adjusting the temperature of the reactor contents to 5° C., 3.45 mmol of n-butyllithium was added and polymerization was initiated. The polymerization was carried out under adiabatic conditions, and the maximum temperature reached 80° C.

After reaching a polymerization conversion rate of 100%, another 10 g of butadiene was added and polymerized, after which 2.76 mmol of methyltriphenoxysilane was added for modification after 15 minutes, followed by addition of 0.86 mmol of silicon tetrachloride. After the reaction, 2,6-di-t-butyl-p-cresol was added to the polymer solution, and then 187.5 g of an extending oil (trade name: FUCCOLE AROMAX #3, product of Fuji Kosan Co.) (37.5 parts by weight to 100 parts by weight of the rubber) was added, the solvent was removed by steam stripping, and the rubber was dried with a hot roll at 115° C. to obtain oil extended rubber. The rubber produced by the polymerization was designated as copolymer rubber D, and the composition and the like of this copolymer rubber D and the oil extended rubber are shown in Table 1.

Using the oil extended rubber prepared above and the high cis-polybutadiene rubber and compatibilizer "b" shown in Table 3, compounded rubber prepared according to formulation Y shown in Table 2 was vulcanized and the properties were evaluated. The results are shown in Table 3.

Synthesis Example 1

Synthesis of Copolymer Rubber E and Preparation of Oil Extended Rubber)

Copolymer rubber E was synthesized in the same manner as copolymer rubber D except that no piperidine was added as in Example 4, and oil extended rubber was prepared therefrom. The composition and the like of the obtained copolymer rubber and oil extended rubber are shown in Table 1.

EXAMPLE 5

Synthesis and Evaluation of Copolymer Rubber F

In a 5-liter volume autoclave reactor displaced with nitrogen there were charged 2500 g of cyclohexane, 38 g of tetrahydrofuran, 100 g of styrene, 385 g of 1,3-butadiene and 3.45 mmol of piperidine. After adjusting the temperature of the reactor contents to 16° C., 3.45 mmol of n-butyllithium was added and polymerization was initiated. The polymerization was carried out under adiabatic conditions, and the maximum temperature reached 90° C.

After reaching a polymerization conversion rate of 100%, another 15 g of butadiene was added and polymerized, after which 0.89 mmol of tin tetrachloride was added. After the reaction 2,6-di-t-butyl-p-cresol was added to the polymer solution, the solvent was removed by steam stripping, and the rubber was dried with a hot roll at 115° C. The rubber produced by the polymerization was designated as copolymer rubber F, and the composition and the like of this copolymer rubber F are shown in Table 1.

Using the copolymer rubber F prepared above and the high cis-polybutadiene rubber and compatibilizer "c" shown in Table 3, compounded rubber prepared according to formulation Y shown in Table 2 was vulcanized and the properties were evaluated. The results are shown in Table 3.

EXAMPLES 6, 7

Synthesis of Copolymer Rubbers G, H, and Preparation and Evaluation of Their Oil Extended Rubbers Copolymer rubber G was synthesized in the same manner as copolymer rubber E except that the amount was increased by charging 0.05 g of divinylbenzene in Synthesis Example 1, and oil extended rubber was prepared therefrom. Copolymer rubber H was synthesized in the same manner as copolymer rubber E except that the addition of 2.76 mmol of methyltriphenoxysilane was changed to addition of 0.15 mmol of silicon tetrachloride and 2.46 mmol of methyltriphenoxysilane in Synthesis Example 1, and oil extended rubber was prepared therefrom. The composition and the like of the obtained copolymer rubbers and oil extended rubbers are shown in Table 1.

Using the oil extended rubbers prepared above and the high cis-polybutadiene rubber and compatibilizer "d" (Example 6) and compatibilizer "a" (Example 7) shown in Table 4, compounded rubbers prepared according to formulation Y shown in Table 2 were vulcanized and the properties were evaluated. The results are shown in Table 4.

EXAMPLE 8–10

The oil extended rubbers of styrene-butadiene copolymer rubbers D and E shown in Table 1 were used with the high cis-polybutadiene rubber and compatibilizers shown in Table 4, and compounded rubbers prepared according to formulations Z,V and W shown in Table 2 were vulcanized and their properties evaluated. The results are shown in Table 4.

EXAMPLES 11–14

The oil extended rubber of styrene-butadiene copolymer rubber E shown in Table 1 was used with the high cis-polybutadiene rubber and compatibilizers shown in Table 5, and compounded rubbers prepared according to formulation Y shown in Table 2 were vulcanized and their properties evaluated. The results are shown in Table 5. Compatibilizer "g" used in Example 13 was a 2:1 weight ratio mixture of silica with the reaction product of, a fatty acid and an amine, and for formulation Y, 3 parts by weight of the mixture was added with respect to 100 parts by weight of the copolymer rubber.

EXAMPLES 15–23

Examples Containing No Compatibilizer

The styrene-butadiene copolymer rubbers A–F and H (oil extended rubber in the case of oil extension) shown in Table 1 were used with the high cis-polybutadiene rubber or natural rubber shown in Tables 6 and 7, and compounded rubbers prepared according to formulations X, T and U shown in Table 2 were vulcanized and their properties evaluated. The results are shown in Tables 6 and 7.

All of these compounded rubbers were mixed using a 1.7 L Banbury mixer kneading machine, for preparation by discharge at a temperature of 158–170° C.

TABLE 1

| Copolymer rubber | A | B | C | D | E | F | G | H |
|---|---|---|---|---|---|---|---|---|
| Bonded styrene (wt %) | 25 | 20 | 26 | 25 | 25 | 21 | 25 | 26 |
| 1,2-bonds of butadiene portion (%) | 73 | 60 | 70 | 70 | 69 | 60 | 70 | 70 |
| Glass transition temperature (° C.) | −20 | −36 | −23 | −24 | −25 | −35 | −24 | −23 |
| Molecular weight distribution (Mw/Mn) | 5.0 | 1.6 | 1.2 | 1.2 | 1.2 | 1.4 | 1.3 | 1.4 |
| Alkoxysilyl group content (mmol)[*1] |  | 0.46 |  | 0.52 | 0.38 |  | 0.34 | 0.41 |
| Amino group content (mmol)[*1] |  |  |  |  | 0.71 |  | 0.68 |  |
| Oil extension of oil extended rubber (phr) | 37.5 | 37.5 | 37.5 | 37.5 | 37.5 | — | 37.5 | 37.5 |
| Copolymer rubber Mooney viscosity (ML1 + 4, 100° C.) | 50 | 35 | 39 | 37 | 38 | 80 | 39 | 41 |

(Table 1 caption)
[*1]The content per 100 g of copolymer rubber is expressed as mmol

TABLE 2

| Formulation | T | U | V | W | X | Y | Z |
|---|---|---|---|---|---|---|---|
| Rubber component*1 | 100 | 100 | 100 | 100 | 100 | 100 | 100 |
| Carbon black*2 | | 30 | 30 | | 7 | 7 | 7 |
| Silica*3 | 40 | 40 | 40 | 40 | 70 | 70 | 70 |
| Dual phase filler*4 | 30 | | | 30 | | | |
| Silane coupling agent*5 | 4 | 4 | 2 | 2 | 3 | 3 | |
| Aromatic oil*6 | | 37.5 | 37.5 | | 37.5 | 37.5 | 37.5 |
| Oil*7 | 37.5 | | | 37.5 | | | |
| Compatibilizer | — | — | 2 | 2 | — | 3 | 7 |
| Zinc oxide | 3 | 3 | 3 | 3 | 3 | 3 | 3 |
| Stearic acid | 2 | 2 | 2 | 2 | 2 | 2 | 2 |
| Antioxidant*8 | 1 | 1 | 1 | 1 | 1 | 1 | 1 |
| Wax | 2 | 2 | 2 | 2 | 2 | 2 | 2 |
| Vulcanization accelerator CZ*9 | 2 | 2 | 2 | 2 | 2 | 2 | 2 |
| Vulcanization accelerator D*10 | 1.5 | 1.5 | 1.5 | 1.5 | 1.5 | 1.5 | 1.5 |
| Sulfur | 2 | 2 | 2 | 2 | 2 | 2 | 2 |

(Table 2 caption)
*1Total amount of styrene-butadiene copolymer rubber and high cis-butadiene rubber or natural rubber
*2"DIABLACK N339", trade name of Mitsubishi Chemical Co.
*3"NIPSIL AQ", trade name of Nippon Silica Co.
*4"ECOBLACK CRX2002", trade name of Cavot Co.
*5"Si69" (bis-(3-triethoxysilylpropyl)-tetrasulphane), trade name of Degusa Co.
*6"FUCCOLE AROMAX #3", trade name of Fuji Kosan Co. (values are totals for the amount of oil in the oil extended rubber and the amount of oil added during formulation)
*7"SHELLFLEX 680", trade name of Showa Shell Oil Co. (values same as above)
*8"NOKURAKU 810NA" (N-phenyl-N'-isopropyl-p-phenylenediamine), trade name of Ouchi Shinko Co.
*9"NOKUSERA CZ" (N-cyclohexyl-2-benzothiadylsulphenamide), trade name of Ouchi Shinko Co.
*10"NOKUSERA D" (diphenylguanidine), trade name of Ouchi

TABLE 3

| | Examples | | | | |
|---|---|---|---|---|---|
| | 1 | 2 | 3 | 4 | 5 |
| Rubber component | | | | | |
| Styrene-butadiene copolymer rubber | | | | | |
| Type | A | B | C | D | F |
| Amount (parts by weight) | 96.25*1 | 96.25*1 | 96.25*1 | 96.25*1 | 70 |
| Natural rubber (parts by weight) | | 30 | | | 30 |
| Butadiene rubber*2 (parts by weight) | 30 | | 30 | 30 | |
| Compatibilizer | a | b | b | b | c |
| Formulation | Y | Y | Y | Y | Y |
| Temperature during mixing (° C.) | 163 | 158 | 160 | 168 | 163 |
| Properties | | | | | |
| Compounded rubber Mooney viscosity | 83 | 79 | 75 | 77 | 64 |
| tan δ (0° C.) | 0.31 | 0.40 | 0.32 | 0.35 | 0.43 |
| tan δ (60° C.) | 0.16 | 0.13 | 0.14 | 0.12 | 0.12 |
| Abrasion resistance factor | 100 | 109 | 110 | 122 | 103 |
| Hardness (25° C., JIS-A) | 71 | 70 | 69 | 68 | 69 |

TABLE 4

| | Examples | | | | |
|---|---|---|---|---|---|
| | 6 | 7 | 8 | 9 | 10 |
| Rubber component | | | | | |
| Styrene-butadiene copolymer rubber | | | | | |
| Type | G | H | D | E | E |
| Amount (parts by weight) | 96.25*1 | 96.25*1 | 96.25*1 | 96.25*1 | 96.25*1 |
| Natural rubber (parts by weight) | | | | | |
| Butadiene rubber*2 (parts by weight) | 30 | 30 | 30 | 30 | 30 |
| Compatibilizer | d | a | b | c | c |
| Formulation | Y | Y | Z | V | W |
| Temperature during mixing (° C.) | 164 | 165 | 170 | 170 | 170 |
| Properties | | | | | |
| Compounded rubber Mooney viscosity | 72 | 80 | 75 | 70 | 72 |
| tan δ (0° C.) | 0.35 | 0.33 | 0.35 | 0.36 | 0.36 |
| tan δ (60° C.) | 0.12 | 0.13 | 0.10 | 0.13 | 0.12 |
| Abrasion resistance | 109 | 105 | 112 | 117 | 113 |
| Hardness (25° C., JIS-A) | 70 | 70 | 72 | 68 | 67 |

TABLE 5

| | Examples | | | |
|---|---|---|---|---|
| | 11 | 12 | 13 | 14 |
| Rubber component | | | | |
| Styrene-butadiene copolymer rubber | | | | |
| Type | E | E | E | E |
| Amount (parts by weight) | 96.25*1 | 96.25*1 | 96.25*1 | 96.25*1 |
| Natural rubber (parts by weight) | | | | |
| Butadiene rubber*2 (parts by weight) | 30 | 30 | 30 | 30 |
| Compatibilizer | e | f | g | h |
| Formulation | Y | Y | Y | Y |
| Temperature during mixing (° C.) | 164 | 165 | 170 | 170 |
| Properties | | | | |
| Compounded rubber Mooney viscosity | 72 | 77 | 75 | 74 |
| tan δ (0° C.) | 0.35 | 0.32 | 0.35 | 0.34 |
| tan δ (60° C.) | 0.12 | 0.13 | 0.10 | 0.10 |
| Abrasion resistance (factor) | 109 | 108 | 112 | 109 |
| Hardness (25° C., JIS-A) | 70 | 69 | 72 | 71 |

TABLE 6

| | | Examples | | | | | |
|---|---|---|---|---|---|---|---|
| | | 15 | 16 | 17 | 18 | 19 | 20 |
| Rubber component | | | | | | | |
| Styrene-butadiene copolymer rubber | Type | A | B | C | D | E | F |
| | Amount (parts by weight) | 96.25*1 | 96.25*1 | 96.25*1 | 96.25*1 | 96.25*1 | 70 |
| Natural rubber (parts by weight) | | | 30 | | | | 30 |
| Butadiene rubber*2 (parts by weight) | | 30 | | 30 | 30 | 30 | |
| Compatibilizer | | — | — | — | — | — | — |
| Formulation | | X | X | X | X | X | X |
| Temperature during mixing (° C.) | | 160 | 159 | 163 | 167 | 165 | 159 |
| Properties | | | | | | | |
| Compounded rubber Mooney viscosity | | 88 | 89 | 85 | 95 | 86 | 80 |
| tan δ (0° C.) | | 0.28 | 0.39 | 0.30 | 0.31 | 0.33 | 0.41 |
| tan δ (60° C.) | | 0.16 | 0.14 | 0.14 | 0.13 | 0.13 | 0.14 |
| Abrasion resistance (factor) | | 95 | 100 | 103 | 117 | 109 | 102 |
| Hardness (25° C., JIS-A) | | 70 | 71 | 70 | 70 | 69 | 68 |

TABLE 7

| | Examples | | |
|---|---|---|---|
| | 21 | 22 | 23 |
| Rubber component Styrene-butadiene copolymer rubber | | | |
| Type | H | E | E |
| Amounts (parts by weight) | 96.25*1 | 96.25*1 | 96.25*1 |
| Natural rubber (parts by weight) | | | |
| Butadiene rubber*2 (parts by weight) | 30 | 30 | 30 |
| Compatibilizer | — | — | — |
| Formulation | X | T | U |
| Temperature during mixing (° C.) | 158 | 170 | 170 |
| Properties | | | |
| Compounded rubber Mooney viscosity | 87 | 100 | 103 |
| tan δ (0° C.) | 0.32 | 0.34 | 0.35 |
| tan δ (60° C.) | 0.15 | 0.15 | 0.16 |
| Abrasion resistance (factor) | 105 | 106 | 105 |
| Hardness (25° C., JIS-A) | 69 | 69 | 72 |

(Tables 3–7 Captions)
*1: Containing 70 parts by weight copolymer rubber and 26.25 parts by weight extender oil
*2: Trade name "BR01", high cis-butadiene rubber by JSR Co.

The following conclusions may be drawn from the results shown in Tables 3–7.

Comparison of the rubber compositions of the invention containing compatibilizer "b" to "g" with the compositions of Examples 15–23 containing no compatibilizer, and with the compositions of Examples 1, 7 and 14 using compatibilizer "a" or "h" shows that the rubber compositions of the invention have low Mooney viscosity and satisfactory workability for the compounded rubber, with no impairment of wet skid properties (a high tan δ (0° C.)), while also having a high level of balance between low hysteresis loss (low tan δ (60° C.)) and abrasion resistance. The rubber compositions of the invention employing styrene-butadiene copolymer rubber containing alkoxysilyl groups and/or amino groups have particularly satisfactory workability with no impairment of wet skid properties, and further improved low hysteresis loss and abrasion resistance.

In Examples 22 and 23 using formulations T and U containing relatively large amounts of sulfur-containing silane coupling agent without inclusion of a compatibilizer, the compounded rubbers had a high Mooney viscosity and poor workability at a high discharge temperature of 170° C. during mixing, whereas in Examples 8–10 which were rubber compositions according to the invention, the compounded rubbers had a low Mooney viscosity and satisfactory workability even at a high discharge temperature of 170° C. during mixing, while exhibiting no impairment of wet skid properties and maintaining a high level of balance between low hysteresis loss and abrasion resistance.

What is claimed is:

1. A rubber composition comprising a diene-based rubber (a), a silica (b) at 5–100 parts by weight to 100 parts by weight of said diene-based rubber (a) and a compatibilizer (c) at 0.1–20 parts by weight to 100 parts by weight of said silica (b), wherein said diene-based rubber (a) contains styrene-butadiene copolymer rubber at 30–100 wt % with respect to said diene-based rubber (a), and wherein said styrene-butadiene copolymer rubber is obtained by copolymerizing styrene with 1,3-butadiene by anionic polymerization using an organic alkali metal compound in the presence of a primary or secondary amine, and said styrene-butadiene copolymer rubber has
(i) a styrene component content of 5–45 wt %;
(ii) a butadiene 1,2-bond content of 10–80 wt %;
(iii) a glass transition temperature of −70 to −10° C.; and
(iv) an amino group content of 0.01–2.0 mmol per 100 g of said copolymer rubber, and said compatibilizer (c) is at least one selected from the group consisting of:
(I) Aminosilane compounds;
(II) Epoxy group-containing compounds;
(III) Compounds with an amino group and a hydroxyl group, compounds with an amino group and an epoxy group, compounds with an amino group and an ether bond, compounds with an amino group and a carboxyl group, compounds with an amino group and an ester bond or compounds with an amino group and a polymerizable unsaturated bond, in the molecule;
(IV) Compounds with a polymerizable unsaturated bond and a hydroxyl group, compounds with a polymerizable unsaturated bond and an epoxy group, compounds with a polymerizable unsaturated bond and an ether bond, compounds with a polymerizable unsaturated bond and a carboxyl group or compounds with a polymerizable unsaturated bond and an ester bond, in the molecule; and
(V) Ether bond-containing compounds.

2. A rubber composition according to claim 1, wherein said compatibilizer (c) is at least one selected from the group consisting of compounds of (I), (II), (III) and (IV) above.

3. A rubber composition comprising a diene-based rubber (a), silica (b) at 5–100 parts by weight to 100 parts by weight of said diene-based rubber (a) and a compatibilizer (c) at 0.1–20 parts by weight to 100 parts by weight of said silica (b), wherein said diene-based rubber (a) contains styrene-butadiene copolymer rubber at 30–100 wt % with respect to said diene-based rubber (a), and
wherein said styrene-butadiene copolymer rubber is obtained by copolymerizing styrene and 1,3-butadiene by anionic polymerization using an organic alkali metal compound, and coupling the active alkali metal end of the resulting polymer with an alkoxysilane compound or a phenoxysilane compound or a toluyloxysilane compound, and
said styrene-butadiene copolymer rubber has
(i) a styrene component content of 5–45 wt %;
(ii) a butadiene 1,2-bond content of 10–80 wt %;
(iii) a glass transition temperature of −70 to −10° C.; and
(iv) an alkoxysilyl group or a phenoxysilyl or a toluyloxysilyl group content of 0.01–5.0 mmol per 100 g of said copolymer rubber, and
said compatibilizer (c) is at least one selected from the group consisting of:
(1) Aminosilane compounds;
(II) Epoxy group-containing compounds;
(III) Compounds with an amino group and a hydroxyl group, compounds with an amino group and an epoxy group, compounds with an amino group and an ether bond, compounds with an amino group and a carboxyl group, compounds with an amino group and an ester bond or compounds with an amino group and a polymerizable unsaturated bond, in the molecule;
(IV) Compounds with a polymerizable unsaturated bond and a hydroxyl group, compounds with a polymerizable unsaturated bond and an epoxy group, compounds with a polymerizable unsaturated bond and an ether bond, compounds with a polymerizable unsaturated bond and a carboxyl group or compounds with a polymerizable unsaturated bond and an ester bond, in the molecule; and
(V) Ether bond-containing compounds.

4. A rubber composition according to claim 3, wherein said compatibilizer (c) is at least one selected from the group consisting of compounds of (I), (II), (III) and (IV) above.

5. A rubber composition comprising a diene-based rubber (a), silica (b) at 5–100 parts by weight to 100 parts by weight of said diene-based rubber (a) and a compatibilizer (c) at 0.1–20 parts by weight to 100 parts by weight of said silica (b), wherein said diene-based rubber (a) contains styrene-butadiene copolymer rubber at 30–100 wt % with respect to said diene-based rubber (a), and
wherein said styrene-butadiene copolymer rubber has both alkoxysilyl, phenoxysilyl or toluyloxysilyl groups, and amino groups, and is obtained by copolymerizing styrene with 1,3-butadiene by anionic polymerization using an organic alkali metal compound in the presence of a primary or secondary amine and bringing the process to almost 100% conversion, and then adding a modifier with alkoxysilyl, phenoxysilyl or toluyloxysilyl groups, and
said styrene-butadiene copolymer rubber has
(i) a styrene component content of 5–45 wt %;
(ii) a butadiene 1,2-bond content of 10–80 wt %;
(iii) a glass transition temperature of −70 to −10° C.; and
(iv) an alkoxysilyl group or a phenoxysilyl or a toluyloxysilyl group content of 0.01–5.0 mmol and an amino group content of 0.01–2.0 mmol per 100 g of said copolymer rubber, and
said compatibilizer (c) is at least one selected from the group consisting of:
(I) Aminosilane compounds;
(II) Epoxy group-containing compounds;
(III) Compounds with an amino group and a hydroxyl group, compounds with an amino group and an epoxy group, compounds with an amino group and an ether bond, compounds with an amino group and a carboxyl group, compounds with an amino group and an ester bond or compounds with an amino group and a polymerizable unsaturated bond, in the molecule;
(IV) Compounds with a polymerizable unsaturated bond and a hydroxyl group, compounds with a polymerizable unsaturated bond and an epoxy group, compounds with a polymerizable unsaturated bond and an ether bond, compounds with a polymerizable unsaturated bond and a carboxyl group or compounds with a polymerizable unsaturated bond and an ester bond, in the molecule; and
(V) Ether bond-containing compounds.

6. A rubber composition according to claim 5, wherein said compatibilizer (c) is at least one selected from the group consisting of compounds of (I), (II), (III) and (IV) above.

7. A rubber composition according to any one of claims 1 through 6, which contains as a filler carbon black at 2–100 parts by weight to 100 parts by weight of said diene-based rubber (a).

8. A tire comprising treads produced from a rubber composition according to claim 7.

9. A tire comprising treads produced from a rubber composition according to any one of claims 1 through 6.

10. A rubber composition comprising a diene-based rubber (a), silica (b) at 5–100 parts by weight to 100 parts by weight of said diene-based rubber (a) and a compatibilizer (c) at 0.1–20 parts by weight to 100 parts by weight of said silica (b), wherein said diene-based rubber (a) contains styrene-butadiene copolymer rubber at 30–100 wt % with respect to said diene-based rubber (a), and said styrene-butadiene copolymer rubber has
  (i) a styrene component content of 5–45 wt %;
  (ii) a butadiene 1,2-bond content of 10–80 wt %;
  (iii) a glass transition temperature of −70 to −10° C.; and
  (iv) an alkoxysilyl group or a phenoxysilyl or a toluyloxysilyl group content of 0.01–5.0 mmol and an amino group content of 0.01–2.0 mmol per 100 g of said copolymer rubber, and said compatibilizer (c) is at least one selected from the group consisting of:
  (I) Aminosilane compounds;
  (II) Epoxy group-containing compounds;
  (III) Compounds with an amino group and a hydroxyl group, compounds with an amino group and an epoxy group, compounds with an amino group and an ether bond, compounds with an amino group and a carboxyl group, compounds with an amino group and an ester bond or compounds with an amino group and a polymerizable unsaturated bond, in the molecule;
  (IV) Compounds with a polymerizable unsaturated bond and a hydroxyl group, compounds with a polymerizable unsaturated bond and an epoxy group, compounds with a polymerizable unsaturated bond and an ether bond, compounds with a polymerizable unsaturated bond and a carboxyl group or compounds with a polymerizable unsaturated bond and an ester bond, in the molecule; and
  (V) Ether bond-containing compounds.

11. A rubber composition according to claim 10, wherein said compatibilizer (c) is at least one selected from the group consisting of compounds of (I), (II), (III) and (IV) above.

* * * * *